Nov. 11, 1952      A. KAUFMANN      2,617,166
BAYONET FASTENING
Filed June 12, 1951
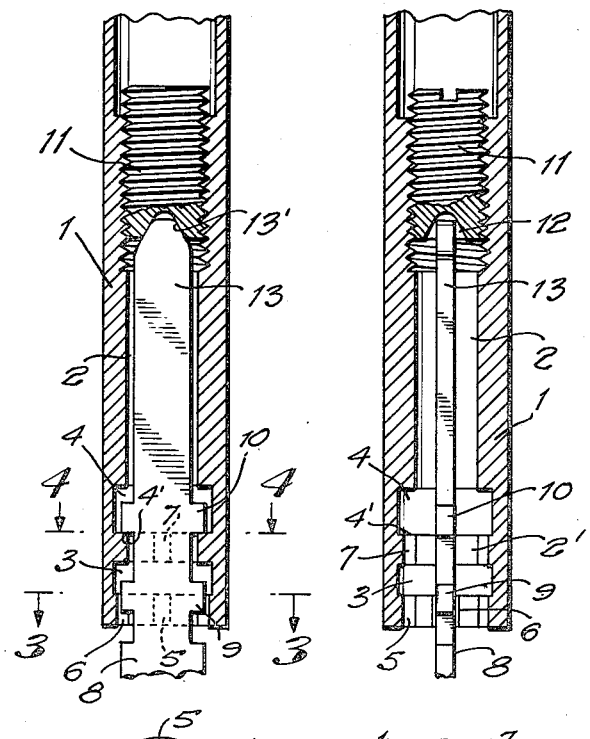
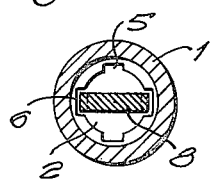      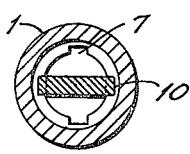
INVENTOR.
ALBERT KAUFMANN Patented Nov. 11, 1952

2,617,166

UNITED STATES PATENT OFFICE 2,617,166

BAYONET FASTENING

Albert Kaufmann, Zuchwil, Switzerland

Application June 12, 1951, Serial No. 231,080
In Switzerland June 17, 1950

7 Claims. (Cl. 24—221)

1

The present invention relates to bayonet fastenings.

One of the objects of the present invention is to provide a fastening device which simultaneously prevents rotation and longitudinal displacement of the fastened element.

A further object of the present invention is to construct such a device in a very simple manner.

A still further object of the present invention is to enable the fastened element to be easily and quickly moved between its fastened and unfastened positions.

An additional object of the present invention is to provide a fastening device which is particularly suitable for the fastening of tools.

With the above objects in view, the present invention mainly consists of an outer tubular member in which the fastened element is located, the said tubular member having a pair of spaced annular grooves formed in the same so as to provide two annular projections within the outer tubular member. One of these projections is formed with two pairs of opposite channels extending therethrough axially of the outer tubular member, and the other of these annular projections is formed with only one pair of opposite channels in alignment with one of the pairs of channels in the one annular projection. The fastened element has two pairs of opposite lugs located along the length thereof spaced from each other, and the spacing between the pairs of lugs is such that the fastened element may be moved into the outer tubular member by passing one of these pairs of lugs through the pairs of channels in the two projections which are aligned with each other, so that the pairs of lugs are respectively located in the two grooves. Then the fastened element is rotated and one of the pairs of lugs is placed within the pair of channels in the one projection which are not in alignment with the pair of channels in the other projection. The other pair of lugs rest against an annular end surface of the other of the projections. The interior of the outer tubular member is screw-threaded and a screw engages these threads and is moved against an end of the fastened element when it is in the above-described position. The pair of lugs located in the channels prevent rotation of the fastened element, and the pair of lugs bearing against the end surface of the other annular projection in cooperation with the screw member bearing against the end of the fastened element prevent longitudinal displacement of the fastened element.

2

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1 and 2 show two vertical sections at right angles to each other; and

Figs. 3 and 4 show cross-sections along the lines A—A and B—B, respectively, of Fig. 1.

The outer tubular member 1, which may, for example, be a toolholder, has a longitudinal bore 2 and two inner annular grooves 3 and 4. From the edge of the bore 2 to the annular groove 3 there is an annular projection in which are machined two pairs of longitudinal channels 5 and 6, disposed crosswise in relation to each other, and in the annular projection lying between the two annular grooves 3 and 4 a pair of longitudinal channels 7 are machined.

An elongated member 8, which in the present example can be the end of a tool, is flattened on both sides and has on the side edges two lateral pairs of lugs 9 and 10 which are spaced from one another. The distance between the two pairs of lugs 9 and 10 differs from the interspace between the two annular grooves 3 and 4 in the tube 1, in such a manner that in the end position of the assembled closure parts the bearing surfaces of the lugs 10 can rest on the annular end surface 4' of the annular groove 4 only when the other lugs 9 engage at least partly into the longitudinal channels 6. It will be noted that the pairs of lugs are spaced apart by a distance which is greater than the space between the annular projections by approximately one half of the width of one of the annular projections. It will also be noted that the distance between the opposite ends of the lugs 9 or the lugs 10 is slightly smaller than the distance between opposite faces of the pairs of channels 5, 6, and 7, respectively.

The arrangement of the lugs and grooves can also be reversed, so that in the bore part between the edge of the bore 2 and the annular groove 3 there is provided only one pair of channels, and in the bore part 2' two pairs of channels are provided. In this case the distances between the lugs 9 and 10 and the grooves 3 and 4 are then such that the lugs 10 engage in a pair of channels when the lugs 9 bear on the relative annular end surface of the annular groove 3.

The outer closure part 1 has, coaxially to the longitudinal bore 2, an internal thread with a securing screw 11 adapted to be screwed thereinto and forming a pressure means. The end of the screw opposite to the screw slot is provided with a central tapered recess 12. The inner closure part 8 has an extension 13, the end of which, as at 13', is shaped to fit into the recess 12 of the securing screw 11.

The procedure for assembling the two parts 1 and 8 is to introduce the part 8 into the outer part 1 in the position in which the lugs 9 and 10 can at the same time freely pass the longitudinal channels 5 and 7, whereupon a mutual twisting of the two parts is effected about the common longitudinal axis until the lugs 9 reach the channel pair 6, into which it can penetrate until the bearing surfaces of the lugs 10 come to rest against the annular surface 4' of the annular groove 4. Thereupon the securing screw 11 is screwed forwards against the end 13' of the extension 13 of the inner closure part 8. The extension 13 is thereby centrally aligned by the recess 12 with regard to the outer closure part 1, and at the same time the lugs 10 of the inner part 8 are pressed against the annular surface 4', whereby all play between the two parts 1 and 8 is eliminated and a rigid connection of the two parts to one another is achieved.

It will be understood that each of the elements described above, or two or more together, may also find a useful application in other types of fastening devices differing from the types described above.

While the invention has been illustrated and described as embodied in a bayonet fastening device which prevents rotation and translation of the fastened part, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection; an elongated member having a cross-sectional area which is smaller than the area included by said annular projections and being formed with two pairs of opposite lugs axially spaced along said elongated member, said pairs of lugs being spaced from each other by a distance which is slightly greater than the distance between said annular projections, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection.

2. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection; an elongated member having a cross-sectional area which is smaller than the area included by said annular projections and being formed with two pairs of opposite lugs axially spaced along said elongated member, said pairs of lugs being spaced from each other by a distance which is greater than the distance between said annular projections by approximately one half of the width of one of said annular projections, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection.

3. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection; an elongated member having a cross-sectional area which is smaller than the area included by said annular projections and being formed with two pairs of opposite lugs axially spaced along said elongated member, said pairs of lugs being spaced from each other by a distance which is slightly greater than the distance between said annular projections, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection, said pressure means comprising a screw threadedly engaging the internal surface of said tubular member and being movable against an end of said elongated member.

4. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection; an elongated member having a cross-sectional area which is smaller than the area included by said annular projections and being formed with two pairs of opposite lugs axially spaced along said elongated member, said pairs of lugs being spaced from each other by a distance which is greater than the distance between said annular projections by approximately one half of the width of one of said annular projections, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection, said pressure means comprising a screw threadedly engaging the internal surface of said tubular member and being movable against an end of said elongated member.

5. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection; an elongated member having a cross-sectional area which is smaller than the area included by said annular projections and being formed with two pairs of opposite lugs axially spaced along said elongated member, said pairs of lugs being spaced from each other by a distance which is greater than the distance between said annular projections by approximately one half of the width of one of said annular projections and each of said pairs of lugs having the opposite ends thereof located apart from each other by a distance which is greater than the internal diameter of said annular projections and less than the distance between opposite faces of each pair of opposite channels, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection, said pressure means comprising a screw threadedly engaging the internal surface of said tubular member and being movable against an end of said elongated member.

6. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection; an elongated member having a cross-sectional area which is smaller than the area included by said annular projections and being formed with two pairs of opposite lugs axially spaced along said elongated member, said pairs of lugs being spaced from each other by a distance which is greater than the distance between said annular projections by approximately one half of the width of one of said annular projections and each of said pairs of lugs having the opposite ends thereof located apart from each other by a distance which is greater than the internal diameter of said annular projections and less than the distance between opposite faces of each pair of opposite channels, said elongated member having a symmetrical tapered end portion, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection, said pressure means comprising a screw threadedly engaging the internal surface of said tubular member and being formed with a central tapered recess extending inwardly from an end thereof facing said annular projections, whereby, when said screw member is moved against said elongated member with said tapered end portion of said elongated member located in said tapered recess of said screw member, said screw member centers said elongated member in said tubular member.

7. A fastening device, comprising in combination, a tubular member having a pair of spaced internal annular projections mounted thereon, one of said annular projections being formed with two pairs of opposite channels extending axially of said tubular member, and the other of said annular projections being formed with one pair of opposite channels extending axially of said tubular member and being aligned with one of said pairs of channels in said one annular projection, said one annular projection being located adjacent an end of said tubular member and said other annular projection being located further from said end of said tubular member than said one annular projection; an elongated member having a cross-sectional area which is smaller than the area included by said annular projections and being formed with two pairs of opposite lugs axially spaced along said elongated member, said pairs of lugs being spaced from each other by a distance which is greater than the distance between said annular projections by approximately one half of the width of one of said annular projections and each of said pairs of lugs having the opposite ends thereof located apart from each other by a distance which is greater than the internal diameter of said annular projections and less than the distance between opposite faces of each pair of opposite channels, said elongated member having a symmetrical tapered end portion, whereby said elongated member may be located within said tubular member with one of said pairs of lugs at least partially located in one of said pairs of channels in said one annular projection and with the other of said pairs of lugs located against an end surface of the other of said annular projections; and pressure means mounted in said tubular member for engaging said elongated member to urge said other pair of lugs thereof against said end surface of said other annular projection, said pressure means comprising a screw threadedly engaging the internal surface of said tubular member and being formed with a central tapered recess extending inwardly from an end thereof facing said annular projections, whereby, when said screw member is moved against said elongated member with said tapered end portion of said elongated member located in said tapered recess of said screw member, said screw member centers said elongated member in said tubular member.

ALBERT KAUFMANN.

REFERENCES CITED

The following references are of record in the file of this patent:

UNITED STATES PATENTS

| Number | Name | Date |
| --- | --- | --- |
| 779,084 | Jones | Jan. 3, 1905 |
| 805,674 | Senderling | Nov. 28, 1905 |